US 8,444,052 B2

(12) United States Patent
Ahmed et al.

(10) Patent No.: US 8,444,052 B2
(45) Date of Patent: May 21, 2013

(54) METHOD AND DEVICE FOR MERCHANT AUTHENTICATION

(75) Inventors: Syed Arif Ahmed, Austin, TX (US);
Rogelio Sosa, Austin, TX (US);
Bertrand Sosa, Austin, TX (US)

(73) Assignee: Rev Worldwide, Inc., Santa Clara, CA (US)

( * ) Notice: Subject to any disclaimer, the term of this patent is extended or adjusted under 35 U.S.C. 154(b) by 45 days.

(21) Appl. No.: 13/206,085

(22) Filed: Aug. 9, 2011

(65) Prior Publication Data

US 2012/0255995 A1 Oct. 11, 2012

Related U.S. Application Data

(60) Provisional application No. 61/471,874, filed on Apr. 5, 2011.

(51) Int. Cl.
*G06K 5/00* (2006.01)
(52) U.S. Cl.
USPC ........................................................ 235/380
(58) Field of Classification Search
USPC .................... 235/380, 383, 379, 385; 705/44, 705/75
See application file for complete search history.

(56) References Cited

U.S. PATENT DOCUMENTS

| | | | | |
|---|---|---|---|---|
| 6,327,578 | B1 * | 12/2001 | Linehan | 705/65 |
| 7,086,590 | B2 * | 8/2006 | Yamagami et al. | 235/383 |
| 7,234,638 | B2 * | 6/2007 | Lee et al. | 235/380 |
| 2007/0267491 | A1 | 11/2007 | Muto et al. | |
| 2008/0313081 | A1 | 12/2008 | Wee | |
| 2011/0302089 | A1 * | 12/2011 | McKenzie | 705/75 |

FOREIGN PATENT DOCUMENTS

| | | |
|---|---|---|
| KR | 10-2001-0100376 A | 11/2001 |
| KR | 10-2006-0131322 A | 12/2006 |
| KR | 10-2010-0045586 A | 5/2010 |

* cited by examiner

*Primary Examiner* — Seung Lee
(74) *Attorney, Agent, or Firm* — William D. Wiese; DuBois, Bryant & Campbell, LLP

(57) ABSTRACT

Conducting payment card transactions through a payment network through a card reader with a merchant authentication code attached. A payment is processed in connection with a transaction using a payment card. Prior to approving the transaction, the payment card holder is contacted and requested to provide the merchant authentication code. If the merchant authentication code provided by the payment card holder is consistent with the merchant authentication code affixed to the device, approving the transaction. The merchant authentication code may be text, a bar code, a quick response code, a hologram or other code. The merchant authentication code may include information regarding the merchant such as location, business name and the like.

32 Claims, 3 Drawing Sheets

METHOD AND DEVICE FOR MERCHANT AUTHENTICATION

PRIORITY STATEMENT UNDER 35 U.S.C. §119 & 37 C.F.R. §1.78

This non-provisional application claims priority based upon prior U.S. Provisional Patent Application Ser. No. 61/471,874 filed Apr. 5, 2011 in the name of Arif Ahmed entitled "Payment Card Acceptance," the disclosure of which is incorporated herein in its entirety by reference as if fully set forth herein.

BACKGROUND OF THE INVENTION

Payment card acceptance on networked devices increases the acceptance of digital currency, reduces the transaction cost and risks associated with the use of cash, improves financial access to the masses, and removes barriers for small businesses across the globe.

In general, there are a wide variety of payment cards available to consumers, including credit cards, debit cards, loyalty cards, membership cards, radio frequency tags, key fobs and other devices or apparatus that store information for use in connection with a payment network. Payment networks are designed to process data stored on payment cards during transactions between merchants and payment card holders. Card readers typically obtain information from a payment card when the card is swiped through or placed in proximity to a card reader. Devices with capabilities for processing such information for payments are known in the art and are becoming more prevalent in the marketplace.

Currently payment card acceptance devices exist that are constructed for specific computing systems, or brands, and that utilize only that specific computing system's data port. The problem with these devices is that they can only be used with those specific computing systems and they are not interchangeable with other systems or brands. Interoperability between different computing system systems or brands is widely thought to be difficult to impossible.

Devices also exist that use audio ports and utilize signal setting resistors. These devices have much broader interoperability but since the selection process of signal setting resistor for a particular phone, by definition, is a function of audio signal characteristics of that phone, there is a possibility that the same device may not work on other phones, or across a wide variety of other phones.

More importantly, in each of the foregoing instances, there is a risk of fraud in the transaction. For example, a person who is not a legitimate merchant and who does not have a authenticated device may skim cards to obtain credit card information during a legitimate transaction. The information obtained can then be used by that person or others in subsequent, illegitimate transactions. This is referred to herein as Type 1 fraud. On the other hand, a legitimate merchant with an authentic device ay use the device to engage in illegitimate transactions (i.e. transactions not authorized by the payment card holder). This is referred to herein as Type 2 fraud.

Accordingly, in light of these problems with conventional wireless card data transmission methods, there exists a need for improved methods, systems, and computer program products for acquiring payment data from networked devices, including devices of different types, by card readers associated with networked devices.

SUMMARY OF THE INVENTION

According to one aspect of the invention, there is provided a method of conducting payment card transactions through a networked device of a user, wherein the networked device comprises a computing application operated by the networked device and the networked device connects to a card reader. The method may comprise acquiring information from a client's payment card using a read head in the card reader; providing such information from the card reader to the networked device through a headphone or similar jack; and processing the data through the computing application; wherein the computing application enables verifying the authorization by communicating with the payment network, associated with at least one payment company associated with the payment card over at least one communication network, wherein the communication is carried out by the computing application using the networked device.

In one embodiments of the invention, the card reader is affixed with a merchant authentication code (either directly from text representation or using their networked device camera to read graphical representation of the code). At any point in time, the payment card holder can read the merchant authentication code from the card reader. The merchant authentication code can then be used by the customer to validate the merchant's authenticity. The customer may be incentivized or required to verify the authentication code of the merchant via a call center, interactive voice response, text messaging, website, mobile application or by incorporating the authentication code in the payment process.

The foregoing has outlined rather broadly certain aspects of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention is directed to improved methods processing payment card transactions. The configuration and use of the presently preferred embodiments are discussed in detail below. It should be appreciated, however, that the present invention provides many applicable inventive concepts that can be embodied in a wide variety of contexts other than traditional payment card processing. Accordingly, the specific embodiments discussed are merely illustrative of specific ways to make and use the invention, and do not limit the scope of the invention. In addition, the following terms shall have the associated meaning when used herein:

"card reader" means a smart card reader, a magnetic strip reader, a bar code reader, a radio frequency reader, a near field communication reader or any other reader capable of ascertaining information from a payment card;

"function" means the transformation of input to a different output, whether through linear transformation, non-linear transformation, phase shift, or any other method.

"inverse function" means a function that undoes another function such that, if an input x into the function $f$ produces an output y, then putting y into the inverse function g produces the output x, and vice versa. Mathematically, if $f(x)=y$, then the inverse function $g(y)=x$.

"networked device" means any device interconnected to a payment system, including without limitation, connected computing devices, mobile phones, smart phones, personal digital assistants and devices with WiFi connectivity;

"payment card" means credit cards, debit cards, loyalty cards, membership cards, radio frequency tags, key fobs and other devices or apparatus that store information for use in connection with a payment network;

"payment network" means any computerized system enabled to receive, store and retrieve data from one or more databases to process transactions on behalf of payment card holders;

"read head" means any device or apparatus which receives information from a payment card; and "signal" means an analog or digital representation of time-varying or spatial-varying quantities.

The present invention provides, among other things, a system and a method for conducting payment card transactions through a user's networked device. The user, may be a retailer, a salesman, or any other user of the networked device. The user may conduct and manage payment card-based monetary transactions by extracting details of the payment card such as the credit card number, expiry date and the name of owner of the card from a portion of the payment card including those details, typically a magnetic strip. Managing of the monetary transaction may include enabling the user to input details of the transaction (e.g., monetary sum, payment conditions etc.) and conducting of the actual transaction via a remote payment network.

Improved Detection of Networked Devices

Figure 1:
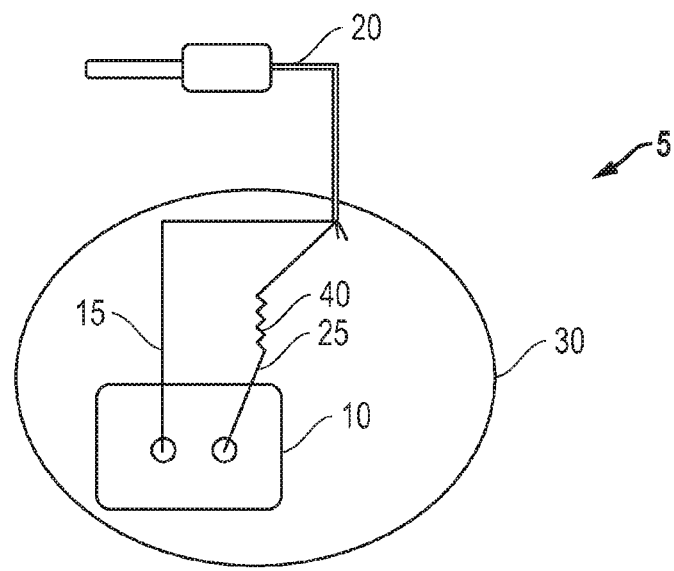
FIG. 1 is a schematic diagram depicting one embodiment of a card reader of the present invention with the ability to detect networked devices.

With reference now to FIG. 1, the overall system consists of card reader 5, a computing system, software operable on the computing system and a server connected to both the software and payment network. The device consists of read head 10 having two connectors 15 and 25. The read head 10 is enclosed within the device housing 30. One read head connector 15 is connected to cable assembly 20. The other connector 25 must also include a impedance matching resistor 40 connected to the output jack 20 on one end. The other end of the assembly 25 is connected to the read head 10.

The card reader 5 comprises a housing 30 and an output jack 20 extending out from the housing 30. The output jack 20 is adapted to be inserted into a networked device through an earphone/microphone socket as is commonly used in many currently-available networked devices such as a microphone input or a line-in audio input of a networked device. The jack 20 may be a TRS (tip, ring, sleeve) or TRRS (tip, ring, ring, sleeve) connector also known as an audio jack, phone plug, jack plug, stereo plug, mini-jack, or mini-stereo audio connector. The jack 20 may be formed of different sizes such as miniaturized versions that are 3.5 mm or 2.5 mm. It is also possible and contemplated that the jack 20 may be retractable within the housing 30. Those skilled in the art will appreciate that the claimed invention can work with any available jack or connector configuration. Standardization of the jack types and widespread usage of them are two of the many advantages that are achieved by the claimed invention.

While input sockets often have switches that can be used for plug detection, most codecs now implement jack sensing that measures the impedance and other characteristics of the plugged in device and make that information available to the processor to which they are connected. The latest computing systems with built-in sockets use a microphone detection circuit that is triggered when a device with certain range of impedance is inserted into the socket. However, it is possible that combination of read head and cable assembly does not have the requisite impedance to trigger the detection circuit of most computing systems.

To overcome this shortcoming, one embodiment of the present invention utilizes an additional matching resistor to ensure that the card reader device's impedance matches the requirements of microphone-detection circuitry of a wide range of networked devices (mobile phones, tablet PCs, and other computing devices) so that the microphone-detection algorithm is triggered upon insertion of the output jack of the card reader of the present invention into the input socket of most computing systems.

While other devices known in the art utilize a signal-setting resistor to limit signal flow to networked devices, possibly to prevent signal clipping by the networked device's audio circuit, this requires that the device be optimized for each particular computing system. However, the present invention does not use a signal setting resistor. In one embodiment, the present invention utilizes an impedance matching resistor to ensure that the computing device's microphone detection circuitry is triggered. If the signal is clipped due to the choice of a particular matching resistor, the device simply lets the signal clipping occur. The clipping that does occur, if any, is corrected by utilizing specialized signal processing schemes in the mobile application to reverse the effects of clipping.

Payment Card Authentication

Figure 2:
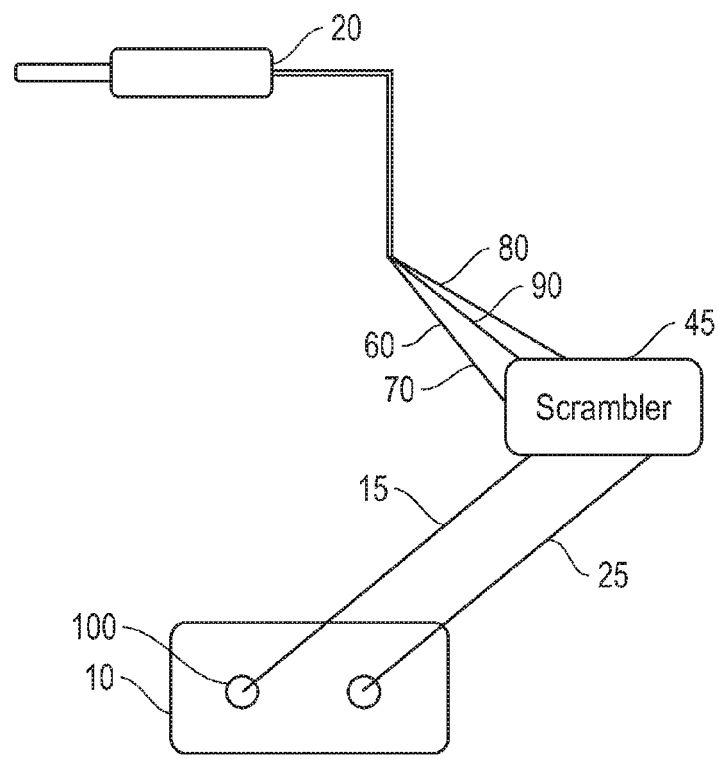
FIG. 2 is a schematic diagram depicting an embodiment of a card reader of the present invention with a scrambler circuit.

The present invention also addresses the issue of fraud in connection with payment card transactions. In one embodiment, the invention reduces or eliminates both Type 1 and Type 2 frauds by adding a scrambler circuit 45 as shown in FIG. 2. Once again, the card reader device consists of read head 10 having two connectors 15 and 25. The read head 10 is enclosed within the device housing 30. Both connectors 15 and 25 are connected to analog circuit 50. Analog circuit 50 is connected to speaker left connector 60 and speaker right connector 70. Analog circuit 50 is also connected to matching resistor 40 which, in turn is connected to mic input connector 80. Analog circuit 50 is also connected to common 90. Each of speaker left connector 60, speaker right connector 70, mic input connector 80 and common 90 are also connected to audio jack 20.

Scrambler circuit 45 receives output signal 100 (a signal representing payment card information) and audio signals from a networked device (not shown) through one or both of speaker left connector 60 and speaker right connector 70. Scrambler circuit 45 scrambles the output signal 100 with the signals from one or both of speaker left connector 60 and speaker right connector 70 to form a transformed signal which is provided to the networked device through the mic input connector 80. In other words, the transformed signal that is provided to the mic input connector 80 is a function of output signal 100 and audio signals received through one or both of speaker left connector 60 and speaker right connector 70. The function may be represented as follows:

Mic input=ƒ(output signal+speaker left connector+ speaker right connector)

When the networked device receives the transformed signal, it is able to determine the output signal (i.e. the payment card information) because it knows the signal provided through the speaker left connector 60, the speaker right connector 70, and the inverse function of the function that was performed on the three signals (i.e. output signal 100 and the signals from the speaker left connector 60 and speaker right connector 70).

The function performed on the output signal 100 and the signals from the speaker left connector 60 and speaker right connector 70 may be any linear or non-linear transformation of the signals. For example, the function may be the addition of the signals so that the transformed signal represents the addition of output signal 100 and the signals from the speaker left connector 60 and speaker right connector 70. Alternatively, the function could be the addition of output signal 100 and the signal from the speaker left connector 60 and the subtraction of the signal from the speaker right connector 70. In various embodiments, the function could be a function that is commonly used throughout the entire payment network, could be determined by the networked device and provided to the card reader as part of the signal sent to speaker left connector 60 or speaker right connector 70, or could be known and used only by the networked device and card reader.

Figure 3:
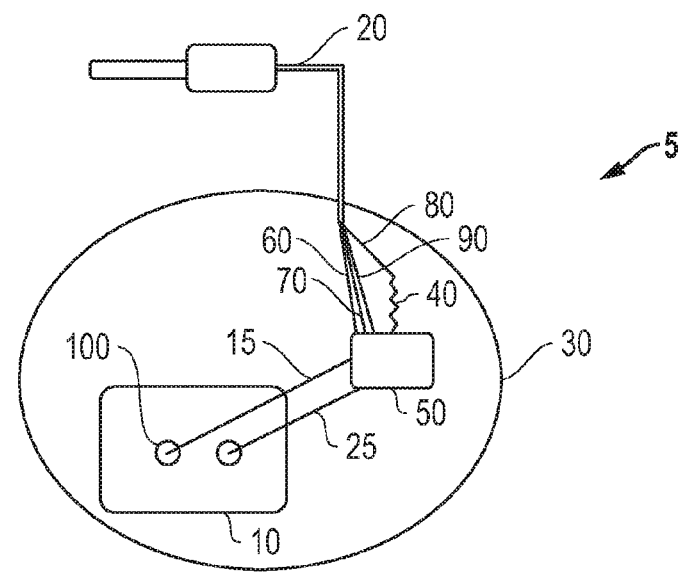
FIG. 3 is a schematic diagram depicting an embodiment of a card reader of the present invention with an audio circuit.

Turning now to FIG. 3, in another embodiment of the present invention, when a predetermined waveform from output signal 100 is fed through speaker left connector 60 and speaker right connector 70, the circuit is closed and the read head output signal 100 is transmitted to mic input connector 80 through the audio circuit 50. In other words, the transformed signal that is provided to the mic input connector 80 is a function of output signal 100 and audio signals received through one or both of speaker left connector 60 and speaker right connector 70. The function may be represented as follows:

Mic input=ƒ(output signal+speaker left connector+ speaker right connector)

On the other hand, if the output signal 100 does not match the predetermined waveform, the output signal 100 is not made available to mic input connector 80 through audio circuit 50 but rather a signal unrelated to output signal 100 is made available to mic input connector 80.

Mic input=d where d is some static voltage uncorrelated with output signal 100 (e.g.—no signal or 3V DC).

In this embodiment, the audio circuit 50 must exactly recognize the "predetermined-waveforms" and the transformed signal (output signal+speaker left connector+speaker right connector) to be able to close the circuit and transmit the transformed signal. This adds another level of protection against any attempted fraud.

Figure 4:
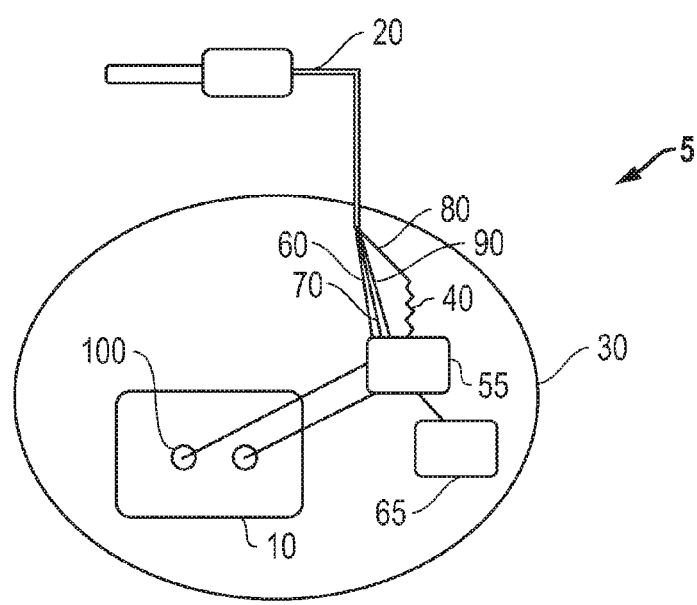
FIG. 4 is a schematic diagram depicting an embodiment of a card reader of the present invention with a codec and a microprocessor.

Yet another embodiment of present invention addresses both Type 1 and Type 2 fraud by adding a codec 55 (D/A and A/D converter) and a small processor or controller 65 as shown in FIG. 4. In this case, processor 65 chooses an encryption key based on the signal received from speaker left connector 60 and speaker right connector 70 and then encrypts the output signal 100 using the encryption key. Processor 65 then outputs the encrypted mic input 80 signal. Depending on the level of encryption, this device can provide a very secure end-to-end communication.

In one embodiment of the present invention, a merchant downloads a mobile application (or such mobile application is automatically downloaded during or after merchant registration) to a networked device such as, for example, through an app store on a network. The mobile application allows merchant to login to the application. If the card reader of the present invention is not connected to the networked device, the merchant is informed to connect the networked device via audio port or use the mobile application to conduct a key-entered transaction. After the merchant connects the card reader to the networked device, the mobile application is ready to accept swiped transactions.

To initiate a transaction, depending on the type of payment card presented, the merchant swipes the payment card or places it in proximity to the card reader. The merchant is prompted to enter the transaction amount. The mobile application may include a provision for charging taxes. If the "charge-tax" setting is set to "Yes", then the amount entered by the merchant is updated to include tax. At this point, either the merchant or the customer can swipe the customer's card through the card reader, recognizing that there may be some advantages in allowing the customer to swipe the card so that the customer may, for example, enter their email and/or networked device number (for receipt), add tip and/or doodle a signature. In such a case, after that the card reader is returned to the merchant and the mobile application is ready to process the payment.

Figure 5:
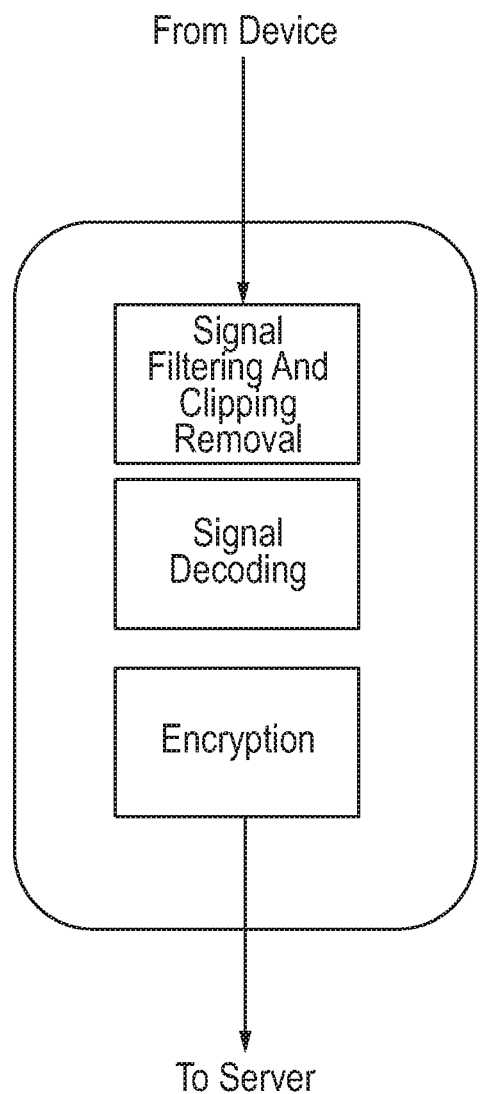
FIG. 5 is a flow diagram schematically illustrating the flow of data from the card reader of the present invention to the payment network.

When payment card is properly read by the card reader, the information stored on the payment card is converted into an audio signal by the read head incorporated in the card reader of the present invention. As shown in FIG. 5, that signal is sent through the input socket, or the microphone-in connection, to the computing system. The mobile application reads the incoming signal, filters and cleans the signal, and removes the effects of clipping, if any. After that, the mobile application unscrambles the signal using the inverse function of the function that was used to scramble the signal. After the unscrambling is complete and card data is available, such data is transmitted to the payment network along with payment information (amount, transaction and merchant details, etc.) in an encrypted form. If the payment network approves the transaction, the mobile application confirms the success of transaction to the merchant and displays the transaction details. If customer requested a receipt, the payment network automatically sends a receipt to the customer's mobile and/or email. The receipt may include location and authentication code of the merchant.

Merchant Authentication

Another aspect of the present invention is the ability to verify a merchant using the card reader. More specifically, the merchant would be provided with a merchant authentication code, which is a unique code assigned to a card reader that is visibly displayed on the card reader as text and/or as a graphic representation of the merchant authentication code (e.g. bar code, quick response code, etc.). The merchant authentication code may include information regarding the merchant's identity, such as the name of the merchant's business and/or the merchant's location.

At any point in time, the payment card holder can read the merchant authentication code from the card reader of the present invention (either directly from text representation or using their networked device camera to read graphical representation of the code). The merchant authentication code can then be used by the customer to validate the merchant's authenticity. For example, the payment card holder may confirm the merchant's identity by sending a text message with the merchant authentication number to a designated SMS number and, in response, the holder will receive a message containing the merchant's identity. Similarly, the payment card holder may be able to enter the merchant authentication number on a website, into a mobile app, or into an interactive voice response system and, in turn, receive a message with the merchant's identity.

In another embodiment, during a transaction, in order to verify that the payment card holder is authorizing a transaction with the merchant, the holder may be incentivized or required to verify the authentication code of the merchant by providing the merchant authentication code through a call center, interactive voice response, text message, website, mobile application or by incorporating the authentication code in the payment process. For example, after a payment card holder's payment card is presented to a merchant and swiped through a card reader, the holder may receive a text message or phone call from the payment card issuer requesting that the holder provide the issuer with the merchant authentication code. If the holder is unable to provide the code or if the code provided by the holder is incorrect, the transaction will not be processed. The issued my establish random, periodic (e.g. every third transaction or first transaction of each day) or rule-based (e.g. any amount over $1,000) verification of the merchant authentication code.

As another option, the card reader of the present invention may incorporate an anti-counterfeiting hologram on the housing to build trust. The inclusion of this type of hologram would quickly allow the payment card holder to determine whether a card reader was authentic and would therefore directly address Type 1 fraud. This hologram image may be separate from the merchant authentication code or may incorporate the merchant authentication code.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of payment card processing devices known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for authenticating a merchant comprising:
    assigning a merchant authentication code to a merchant's card reader, wherein said card reader is connected to a payment network, and wherein information regarding the merchant may be derived from the merchant authentication code;
    receiving the merchant authentication code from a payment card holder;
    providing information regarding the merchant to the payment card holder whereby the payment card holder can authenticate the merchant.

2. The method of claim 1 wherein the merchant authentication code is represented by a graphic and the payment card holder provides a picture of the merchant authentication code when requested.

3. The method of claim 1 wherein the merchant authentication code is represented by a bar code.

4. The method of claim 1 wherein the merchant authentication code is represented by a quick response code.

5. The method of claim 1 wherein the merchant authentication code is represented by a hologram.

6. The method of claim 1 wherein the merchant authentication code includes information regarding the location of the merchant.

7. The method of claim 1 wherein the merchant authentication code includes information regarding the merchant's identity.

8. The method of claim 1 wherein the merchant authentication code includes information regarding the name of the merchant's business.

9. A device for authenticating the identity of a merchant comprising:
    a card reader connected to a payment network, the card reader having an assigned merchant authentication code, wherein information regarding the merchant may be derived from the merchant authentication code; and
    wherein a payment card holder can provide the merchant authentication code assigned to the card reader and, in response, receives information regarding the merchant so that the payment card holder can authenticate the merchant.

10. The device of claim 9 wherein the merchant authentication code is represented by a graphic and the payment card holder provides a picture of the merchant authentication code when requested.

11. The device of claim 9 wherein the merchant authentication code is represented by a bar code.

12. The device of claim 9 wherein the merchant authentication code is represented by a quick response code.

13. The device of claim 9 wherein the merchant authentication code is represented by a hologram.

14. The device of claim 9 wherein the merchant authentication code includes information regarding the location of the merchant.

15. The device of claim 9 wherein the merchant authentication code includes information regarding the merchant's identity.

16. The device of claim 9 wherein the merchant authentication code includes information regarding the name of the merchant's business.

17. A method for authenticating a merchant in a payment card transaction comprising:

assigning a merchant authentication code to a card reader connected to a payment network, wherein information applicable to transactions processed through the card reader may be derived from the merchant authentication code;

either prior to or after a payment card is processed through the card reader, receiving the merchant authentication code assigned to the card reader from a payment card holder; and when the payment card holder's payment card is processed through the card reader in a proposed transaction, if the information regarding the transaction included in the merchant authentication code provided by the payment card holder is consistent with the proposed transaction, approving the proposed transaction.

18. The method of claim 17 wherein the merchant authentication code is represented by a graphic and the payment card holder provides a picture of the merchant authentication code when requested.

19. The method of claim 17 wherein the merchant authentication code is represented by a bar code.

20. The method of claim 17 wherein the merchant authentication code is represented by a quick response code.

21. The method of claim 17 wherein the merchant authentication code is represented by a hologram.

22. The method of claim 17 wherein the merchant authentication code includes information regarding the location of the merchant.

23. The method of claim 17 wherein the merchant authentication code includes information regarding the merchant's identity.

24. The method of claim 17 wherein the merchant authentication code includes information regarding the name of the merchant's business.

25. A device for authenticating the identity of a merchant comprising:

a card reader connected to a payment network, the card reader having an assigned merchant authentication code, wherein information applicable to transactions processed through the card reader may be derived from the merchant authentication code; and wherein prior to authorizing a proposed payment card transaction processed through the card reader, contacting the payment card holder and requesting that the payment card holder provide the merchant authentication code assigned to the card reader and, if the information included in the merchant authentication code provided by the payment card holder is consistent with the proposed payment card transaction, approving the proposed payment card transaction.

26. The device of claim 25 wherein the merchant authentication code is represented by a graphic and the payment card holder provides a picture of the merchant authentication code when requested.

27. The device of claim 25 wherein the merchant authentication code is represented by a bar code.

28. The device of claim 25 wherein the merchant authentication code is represented by a quick response code.

29. The device of claim 25 wherein the merchant authentication code is represented by a hologram.

30. The device of claim 25 wherein the merchant authentication code includes information regarding the location of the merchant.

31. The device of claim 25 wherein the merchant authentication code includes information regarding the merchant's identity.

32. The device of claim 25 wherein the merchant authentication code includes information regarding the name of the merchant's business.

* * * * *